Feb. 25, 1969          H. F. KRABBE          3,429,189
PULSE TORQUING DIGITAL ACCELEROMETER AND METHOD
Filed Jan. 25, 1965
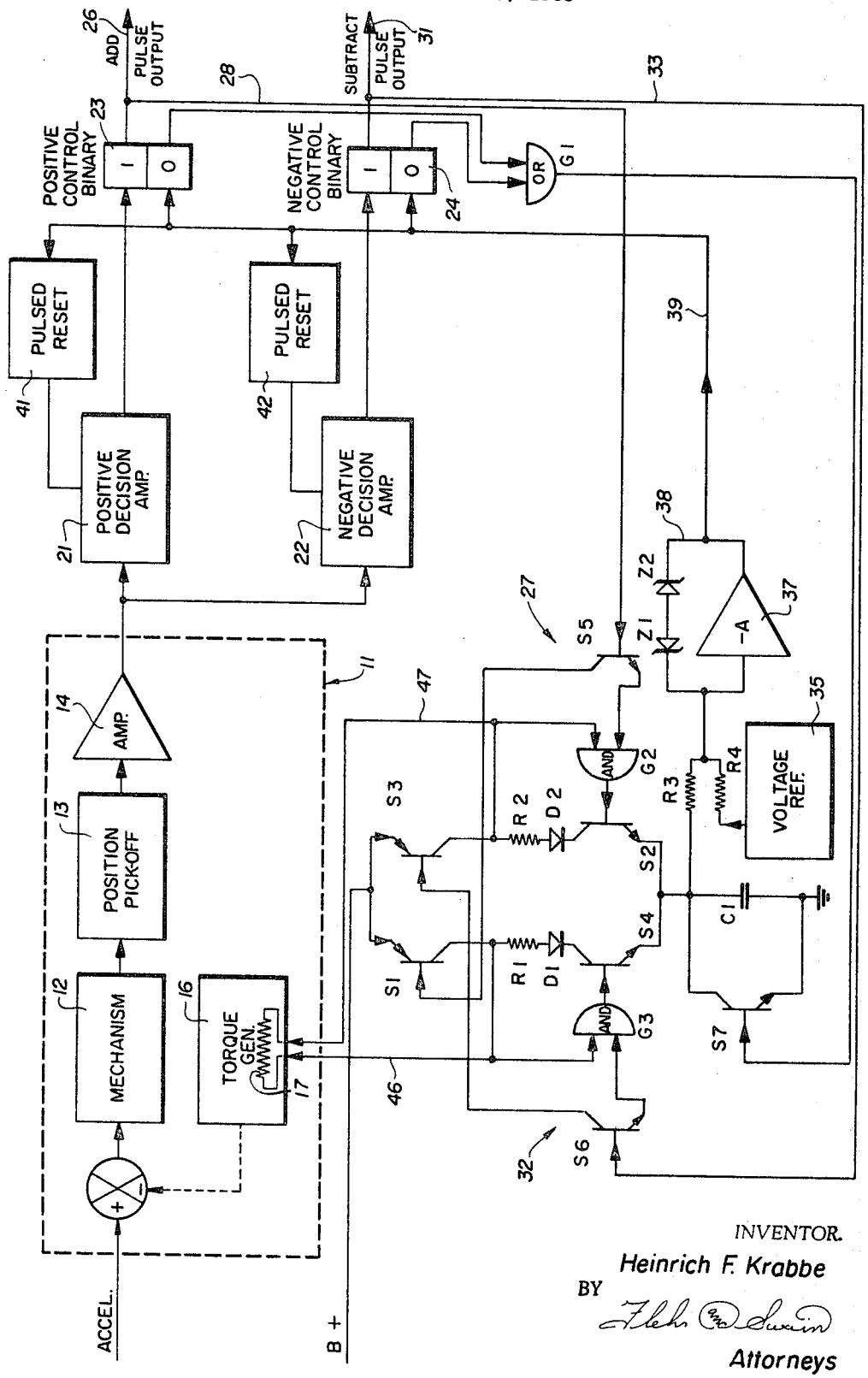
INVENTOR.
Heinrich F. Krabbe
BY
*Attorneys*

United States Patent Office
3,429,189
Patented Feb. 25, 1969

3,429,189
PULSE TORQUING DIGITAL ACCELEROMETER AND METHOD
Heinrich Friedrich Krabbe, Concord, Calif., assignor to Systron-Donner Corporation, Concord, Calif., a corporation of California
Filed Jan. 25, 1965, Ser. No. 427,713
U.S. Cl. 73—517      10 Claims
Int. Cl. G01p 15/08

ABSTRACT OF THE DISCLOSURE

A digital accelerometer with a mass for sensing acceleration in either a positive or negative direction and producing a pulse output for a predetermined deviation. A restoring torque generator for the mass is coupled to a capacitor through a switch. The capacitor is allowed to charge when a pulse is received thus supplying energy to the restoring torque generator. Charging of the capacitor is terminated when the voltage across it reaches a predetermined reference level thus terminating the restoring torque.

---

This invention relates to a digital accelerometer and method and more particularly to a pulse torquing digital accelerometer and method.

Digital accelerometers heretofore available have been relatively expensive and have often required the use of highly stable constant current sources and precision clocks. There is a need for a simplified digital accelerometer which is relatively inexpensive and does not require such components.

In general, it is an object of the present invention to provide a digital accelerometer and method which does not require the use of highly stable constant current sources and precision clocks normally associated with digital accelerometers.

Another object of the invention is to provide a digital accelerometer and method of the above character which utilizes pulse rebalancing.

Another object of the invention is to provide a digital accelerometer and method of the above character which makes use of charge sampling.

Another object of the invention is to provide a digital accelerometer and method of the above character in which accurate control of the rebalance pulse area is accomplished.

Another object of the invention is to provide a digital accelerometer of the above character which is relatively simple and inexpensive.

Additional objects and features of the invention will appear from the following description in which the preferred embodiment of the invention is set forth in conjunction with the accompanying drawing which shows a block diagram of a pulse torquing digital accelerometer incorporating the present invention.

As shown in the drawing, the digital accelerometer consists of an accelerometer assembly 11. This accelerometer assembly 11 can be of any suitable type such as found in the Model 4310 Servo Accelerometer manufactured by Systron-Donner Corporation of Concord, Calif. Such an accelerometer is also described in U.S. Letters Patent No. 3,074,279. The accelerometer assembly 11 is provided for measuring the analog variable acceleration and, as shown in the block diagram in the drawing and as described in U.S. Letters Patent No. 3,074,279, includes a mechanism 12, a position pickoff 13, a servo amplifier 14 and a torque generator 16. The mechanism 12 consists of a pendulous mass in the form of a pivot and jewel-supported pendulum to produce a torque about the pivot axis for the pendulum to cause movement of the pendulum. The position pickoff 13 senses movement of the pendulum and produces an electrical output which is supplied to a servo amplifier 14. In the conventional analog accelerometer, the output of the amplifier 14 is supplied to a torque generator 16 which, as disclosed in U.S. Letters Patent No. 3,074,279, is in the form of a coil 17 mounted on the pendulum about the pivot axis to apply a restoring torque to the pendulum. The torque produced by the torque generator 16 is produced by current flow through the coil in an applied permanent magnetic field. The torque produced by this current flow in the torque generator is exactly equal and opposite to the force produced by the input acceleration so that movement of the pendulum will cease and there will be no net torque present. The current flow from the amplifier 14 gives a direct measure of the acceleration acting upon the pendulum.

The conventional analog feedback loop from the amplifier 14 to the torque generator 16 is broken and a "pulse-on demand" system is inserted in the present accelerometer. Thus, the output from the DC servo amplifier 14 is supplied to two decision amplifiers 21 and 22 in which the amplifier 21 is identified as a positive decision amplifier and the amplifier 22 is identified as the negative decision amplifier. Each of these decision amplifiers 21 and 22 is preset to a true voltage representing a pendulum position deviation limit, one on each side of the null position for the pendulum. The decision amplifiers can be of any suitable type such as a Schmitt trigger circuit. When the pendulum moves beyond one of the set limits, the appropriate decision amplifier is triggered. One side of a positive control binary 23 is connected to the output of the positive decision amplifier 21. Similarly, one side of the negative control binary 24 is connected to the output of the negative decision amplifier 22. Thus, when a decision amplifier is triggered, the associated binary is triggered to shift it from one stable state to the other stable state. The control binaries 23 and 24 supply the add and subtract pulses for the register (not shown) provided for counting purposes and also provide the control for either the negative or positive pulse which is driving the torque generator 16 of the digital accelerometer. Thus, as shown in the drawing, the output from one side of the binary 23 is connected to an add pulse output line 26 which is connected to the regitser. The line 26 is also connected to a positive power switch 27 by a line 28. The positive power switch 27 consists basically of transistors S1, S2 and S5, and a gate G2. The other output from the other side of the binary 23 is connected to one input of an OR gate G1. Similarly, the output from one side of the negative control binary 24 is connected to a subtract pulse output line 31 which is adapted to be connected to the register. The line 31 is also connected to a negative power switch 32 by a line 33. The negative power switch consists basically of transistors S3, S4 and S6, and a gate G3.

In the positive power switch, the base of the transistor S5 is connected to the line 28. The emitter of the transistor S5 is connected to one side of the AND gate G2. The collector of transistor S5 is connected to the base of the transistor S1. The emitters of the transistors S1 and S3 are connected to the B+ supply. Similarly, the base of the transistor S6 is connected to the line 33. The emitter of the transistor S6 is connected to one side of the AND gate G3. The collector of the transistor S6 is connected to the base of the transistor S3. The collector of the transistor S1 is connected to one side of the AND gate G3 and is also connected to the collector of the transistor S4 through the resistor R1 and the diode D1. Similarly, the collector of the transistor S3 is connected to one side of the AND gate G2 and is also connected to the collector of the transistor S2 through a resistor R2 and a diode D2. The emitters of the transistors S2 and S4 are interconnected and are connected to one side of common mode capacitor C1. The other side of the common mode capacitor C1 is connected to ground as shown. The ungrounded side of the common mode capacitor C1 is also connected through summing resistors R3 and R4 to a voltage reference 35. A summing point 36 between the two resistors R3 and R4 is connected to an operational amplifier 37. A feedback loop 38 is provided around the amplifier and consists of serially connected Zener diodes Z1 and Z2.

The output of the operational amplifier 37 is connected by a line 39 to the other inputs of the sides of the positive and negative control binaries 23 and 24 as shown. The line 39 is also connected to pulsed reset circuits 41 and 42 for the positive and negative decision amplifiers 21 and 22. The pulsed reset circuits 41 and 42 merely consist of RC networks which provide a delayed pulse feedback for resetting the Schmitt trigger circuits used for the decision amplifiers 21 and 22. The output of the OR gate G1 is connected to a reset switch S7 by a conductor 44. The reset switch S7 is connected to opposite sides of the common mode capacitor C1. Conductors 46 and 47 are connected to the torque generator 16 and are connected to the collectors of the transistors S1 and S3. The transistors S1–S7 can be of any suitable type. Thus, S1 and S3 can be PNP transistors, whereas the others can be NPN transistors.

Operation of the digital accelerometer may now be briefly described as follows. Let it be assumed that the digital accelerometer is undergoing a positive acceleration. As explained previously, this causes the amplifier 14 to supply a voltage at its output for the purpose of driving the necessary logic and digitizing circuitry hereinbefore described for pulse rebalancing. This output is fed into the positive decision amplifier 21 which is preset to a set limit for maximum deviation of the pendulum before a pulse will be produced. Let it be assumed that the positive acceleration being applied to the digital accelerometer is sufficiently great so that movement of the pendulum exceeds this maximum position and causes the positive decision amplifier 21 to be triggered. This triggering of the positive decision amplifier causes the positive control binary 23 to be shifted from the stable state shown in the drawing to its other stable state. This causes the binary 23 to supply an add pulse on its output 26 which can be registered in the register. At the same time, this positive output is supplied to the positive power switch 27 to the base of the transistor S5. This causes the transistor S5 to be turned on. This causes a signal to be supplied to one side of the AND gate G2 and also causes a signal to be supplied to the base of the transistor S1 to turn it on. As soon as the transistor S1 is turned on, a signal is supplied through the torque generator 16 to the other side of the AND gate G2 to supply a signal to the base of the transistor S2. At the same time, an increased voltage is supplied to the resistor R2 and through the diode D2 together with the signal from the AND gate G2 causes the transistor S2 to be turned on to begin the charging of the capacitor C1. The current which is charging the capacitor C1 is flowing through the torque coil 17 of the torque generator 16 and is causing generation of torque tending to restore the pendulous mass to the center of mid-point position. This current flow is from B+ through the transistor S1, through the torque coil 17 of the torque generator through the resistor R2, the diode D2, the transistor S2, the capacitor C1, to ground. This current flow continues to charge the capacitor C1 and when the charge on the capacitor reaches a predetermined voltage after a certain time depending on the current flow which, in turn, depends on the impedance of the winding of the winding 17 of the torque generator 16 and the impedance of the series resistor R2, the operational amplifier 37 will switch over from a positive level to a negative level. The operational amplifier 37 thus, in effect, can be called a voltage comparator. It compares the voltages at the junction 36. When the voltage from the voltage reference 35 and the voltage on the capacitor C1 are equal, assuming that the resistors R3 and R4 are equal, the amplifier 37 will switch very rapidly from an initial positive limit level to the negative limit level. This occurs because the Zener diodes Z1 and Z2, which act as limiters, are connected back-to-back across the output and input of the amplifier and prevent the amplifier from going into saturation. Thus, for example, with a positive input into the amplifier 37, the Zener diode Z2 would be acting as a forward diode whereas the Zener diode Z1 would be acting in a reverse direction. It is desirable to limit the amplifier 37 in this manner so that it will always be operating in a linear region whereby it can switch very rapidly. Thus, when the current from the capacitor C1 to the junction 36 of the amplifier 37 is coming closer in magnitude to the current from the voltage reference 35, then the amplifier 37 will pull into the linear region away from the positive or negative limit level. The amplifier will then be able to switch very rapidly because it is operating with a very high open loop gain as, for example, a gain of three or four million.

As pointed out above, when the voltage on the capacitor C1 and the reference voltage become equal, the amplifier 37 switches very rapidly from the positive limit level to the negative limit level. The output from the amplifier 37 is supplied to the input of one side of the positive control binary 23 to reset the binary 23. At the same time, a signal is supplied to the pulse reset circuitry 41 which resets the positive decision amplifier 21 after a predetermined delay to assure a reset of this decision amplifier in case the accelerometer output is still beyond the switching limit of decision amplifier 21. This is necessary since decision amplifier 21 normally only resets when the input voltage drops well below the switching level. This reset also is a must for any saturation condition. In the case where the input voltage to the decision amplifier 21 has not returned below the reset level, another pulse will be initiated after the reset pulse has occurred and the same cycle is repeated until the input voltage to decision amplifier 21 is below the preset level.

When the positive control binary 23 is reset, a signal is supplied to the OR gate G1 which supplies a signal on the line 44 to turn on the reset switch S7. The reset switch S7 then discharges the capacitor C1.

When the positive control binary 23 is reset, the signal is removed from the line 28 so that the positive power switch 27 is turned off. At this time, the current pulse through the torque generator will stop. During the time that current was flowing in the torque generator 16, however, it had driven the pendulum from the more positive position back to a more negative position. If the positive acceleration is still acting upon the pendulous mass, the same sequence of steps hereinbefore set forth will occur. Therefore, depending upon the acceleration being applied to the digital accelerometer, the amount or magnitude of acceleration will be determined by the frequency of the pulses which are generated by the pulse-on-demand system hereinbefore described. The frequency of the pulses basically represents acceleration information desired while each individual pulse represents a discrete increment of velocity because it is integrated with respect to time. Thus, to construct a velocity meter, it would only be necessary to count the number of pulses to give a definite indication of the velocity.

When a negative acceleration is being sensed, a very similar sequence of steps will occur. The negative decision amplifier will be triggered to cause the negative control binary to be triggered. A signal is supplied to the negative power switch 32 which causes the transistors S3, S6 and S4 to be turned on in much the same manner that transistors S5, S1 and S2 were turned on to cause the capacitor C1 to be charged. When the voltage on the capacitor C1 is equal to the reference voltage from the voltage reference 35, the amplifier 37 will switch very rapidly from the positive limit level to the negative limit level to supply a signal to the negative control binary 24 to reset the same. A signal is also supplied to the pulse reset 42 which resets the negative decision amplifier 22 after an appropriate delay. A signal is supplied from the binary 24 through the OR gate G1 to the reset switch S7 which discharges the capacitor C1.

In the positive power switch 27 and the negative power switch 32 it is desirable to use the three transistors shown plus the associated AND gate. The transistors S5 and S6 serve as a drive transistor to provide the proper signal level for driving the two associated transistors. The AND gate associated with each of the power switches is desirable because it ensures that all the current which is utilized for charging the capacitor C1 is actually flowing through the torque coil 17.

From the foregoing, it can be seen that the output from the digital accelerometer shown in the drawing appears as pulses on the add and subtract output lines 26 and 31. Thus, by way of example, an incremental velocity increase of one foot per second produces a single pulse on the add line and, similarly, an incremental velocity decrease of one foot per second produces a single pulse on the subtract 31. The digital accelerometer, as shown in the drawing, permits the use of digital integration techniques to accumulate the velocity increments. This approach reduces the long-term drift errors that would normally require consideration if a fully analog velocity system were to be used. Symmetrical, high current pulses are utilized to servo rebalance the pendulous system. The function, however, is still the same as for an analog accelerometer in which the current is caused to flow in the torque generator 16 upon command of the amplifier and its associated digital electronics. An ideal torque balance is still achieved between the torque due to the applied acceleration and the restoring torque produced by the current pulses.

The analogy between a digital and an analog servo rebalance system can be readily shown. Each pulse of the digital rebalance system has a constant area of $(i_1 t_1)$ and the average current represented by these pulses is $n i_1 t_1 / t$.

At torque balance then, the average current equals the $i_s$ of the analog loop:

$$i_s = (N/t) i_1 t_1 = K s A i(t) \tag{1}$$

where $i_s$ = servo current in analog loop
$N/t$ = number of pulses per unit time
$i_1 t_1$ = area of single pulse
$Ks$ = sensitivity constant of the analog loop in ma./G
$Ai(t)$ = input acceleration Since $(i_1 t_1)$ is kept constant, the frequency $(N/t)$ is directly proportional to $i_s$ and the input acceleration $Ai(t)$.

To demonstrate that a single pulse has dimensions of velocity, Equation 1 can be shown as follows:

Observing a singular, non-repetitive pulse:

$$KsAi(t) = \frac{i_1 t_1}{t}$$

and since $i_1 t_1$ by definition is a constant:

$$t[Ai(t)] = \frac{i_1 t_1}{Ks} = K$$

By dimensional analysis of this expression it can be seen that the constant, K, is expressed in feet per second or acceleration times time $[Ai(t)]t$.

From the foregoing presentation, it can be seen that each output pulse represents a certain increment of velocity while the repetition rate or frequency of the output pulses is proportional to acceleration. The circuitry provides an output indication of either positively or negatively varying velocity increments depending upon the polarity of acceleration acting upon the digital accelerometer.

By way of example, if a velocity increment chosen for the digital accelerometer is one foot per second and then assuming a 10 G maximum full scale acceleration, the accelerometer's output repetition rate would be 322 pulses per second. Also, by way of example, the pulse would have a length of approximately 1.5 milliseconds, more than sufficient time to completely reverse the condition of all the logic circuitry and discharge the sampling capacitor C1.

It is apparent from the foregoing that I have provided a new and improved digital accelerometer utilizing pulse torquing which is relatively simple and which still has great accuracy. This is because of the fact that the torque generator is turned on and off periodically, the basic friction of the mechanism is reduced or almost completely eliminated. Also, because of dithering of the pendulous mass around the zero region, the sensitivity to cross axis acceleration inputs is reduced. This digital accelerometer is capable of performing precision measurements without the use of a precision clock to control the width of the torque pulses. In addition, no ultra-stable current supplies are required.

It is apparent from the foregoing that I have provided a pulse torquing digital accelerometer and method in which pulse rebalancing is utilized. By the use of digital integration techniques, a relatively simple digital accelerometer is provided which minimizes long-term drift errors.

I claim:

1. In a digital accelerometer, a pendulous mass for sensing acceleration, means for sensing the position of the pendulous mass, means for restoring the pendulous mass to a predetermined position, means for supplying either a positive or negative pulse whenever the pendulous mass is shifted from its predetermined position in either of two directions beyond a preset maximum deviation, a charge capacitor series coupled to said restoring means, means for supplying a common series current to the restoring means and to the charge capacitor whenever a pulse is created, a reference, and means for determining when the voltage on the charge capacitor is equal to the reference to terminate the flow of said common series current through the charge capacitor and to the restoring means whereby said capacitor determines the energy applied to said restoring means.

2. A digital accelerometer as in claim 1 together with means for discharging the capacitor each time current flow through the capacitor is terminated.

3. A digital accelerometer as in claim 1 wherein said means for supplying current to the charge capacitor and to the restoring means includes a positive power switch connected to the restoring means and to the charge capacitor and a negative power switch connected to the restoring means and to the charge capacitor.

4. A digital accelerometer as in claim 3 in which the positive power switch and the negative power switch are arranged so that all of the charge current which is charging the charge capacitor is flowing through the restoring means.

5. In a digital accelerometer, a pendulous mass for sensing acceleration, means for sensing the position of the pendulous mass, means for restoring the pendulous mass to a predetermined position, means connected to the means for sensing the position of the pendulous mass for producing either a positive pulse or a negative pulse when the pendulous mass is shifted from its predetermined position beyond a maximum deviation, means connected to the means for supplying pulses for creating either a positive signal or a negative signal whenever a positive pulse or a negative pulse is produced, a charge capacitor series coupled to said restoring means, means for supplying a common series current to the restoring means and to the charge capacitor whenever a positive or negative signal is created, a reference, means for determining when the charge on the capacitor is equal to the reference, and means for terminating common current flow through the capacitor when the charge on the capacitor substantially equals the reference whereby said capacitor determines the energy applied to said restoring means.

6. A digital accelerometer as in claim 5 together with means for discharging the charge capacitor when current flow through the capacitor is terminated.

7. In a digital accelerometer, a pendulous mass for sensing acceleration, means for sensing the position of the pendulous mass, means for restoring the pendulous mass to a predetermined position, positive decision means connected to the sensing means and producing an output whenever the pendulous mass is shifted from its predetermined position beyond a preset maximum deviation in one direction, negative decision means connected to the output of the sensing means for producing an output whenever the pendulous mass is shifted from its predetermined position beyond a maximum deviation in an opposite direction, a positive control binary having two inputs and two outputs with one input connected to the positive decision means, a negative control binary having two inputs and two outputs with one input connected to the negative decision means, said positive decision means serving to flip said positive control binary from one stable state to another stable state whenever the pendulous mass is shifted beyond said maximum deviation in one direction, said negative decision means serving to flip said negative control binary from one stable state to its other stable state whenever the pendulous mass has been shifted beyond a maximum deviation in an opposite direction, a charge capacitor, a positive power switch connected to the charge capacitor and to the restoring means and to one output of the positive control binary, a negative power switch connected to the charge capacitor and to the restoring means and to one side of the negative control binary, a reference, comparison means for determining when the voltage on the charge capacitor is equal to the voltage from the reference, and means connected to the comparison means and to the other input of the positive control binary and the negative control binary for resetting the binaries.

8. A digital accelerometer as in claim 7 together with an OR gate having two inputs and one output, one input of the OR gate being connected to the other output of the positive control binary and the other input to the OR gate being connected to the other output of the negative control binary, and means connected to the output of the OR gate for discharging the charge capacitor.

9. A digital accelerometer as in claim 7 wherein said positive decision means and said negative decision means are Schmitt trigger circuits, together with means connected to the comparison means for resetting the Schmitt trigger circuits at the time that the charge on the charge capacitor reaches the voltage of the reference.

10. A digital accelerometer as in claim 7 wherein said positive power switch and negative power switch each includes first, second and third transistors each having base, collector and emitter elements, the first transistor being connected to the restoring means, the second transistor being connected to the charge capacitor and the third transistor being connected to the associated binary, the third transistor serving as a driving transistor for the first and second transistors, and an AND gate having two inputs and one output, the output being connected to the second transistor, one of the inputs being connected to the first transistor and the other input being connected to the restoring means.

References Cited

UNITED STATES PATENTS

| | | | |
|---|---|---|---|
| 2,943,493 | 7/1960 | ten Bosch et al. | 73—503 |
| 3,204,466 | 9/1965 | Henderson | 73—517 |

JAMES J. GILL, *Primary Examiner.*